R. M. WATSON.
LOOSE LEAF BINDER.
APPLICATION FILED OCT. 12, 1912.

1,057,103.

Patented Mar. 25, 1913.

WITNESS
Robert N. Van Doskids
Agnes M. Hipkins

INVENTOR
Richard M. Watson
BY Ralzemond A. Parker
ATTORNEY

UNITED STATES PATENT OFFICE.

RICHARD M. WATSON, OF DETROIT, MICHIGAN.

LOOSE-LEAF BINDER.

1,057,103. Specification of Letters Patent. Patented Mar. 25, 1913.

Application filed October 12, 1912. Serial No. 725,359.

*To all whom it may concern:*

Be it known that I, RICHARD M. WATSON, a citizen of the United States, residing at Detroit, county of Wayne, State of Michigan, have invented a certain new and useful Improvement in Loose-Leaf Binders, and declare the following to be a full, clear, and exact description of the same, such as will enable others skilled in the art to which it pertains to make and use the same, reference being had to the accompanying drawings, which form a part of this specification.

This invention relates to loose-leaf binders and has for its object a loose-leaf binder for which the spring action is afforded by the rivets that hold the half-ring carrying plates together. This does away with spring action in the base plate, thereby allowing the use of a flat cover plate.

Figure 1:
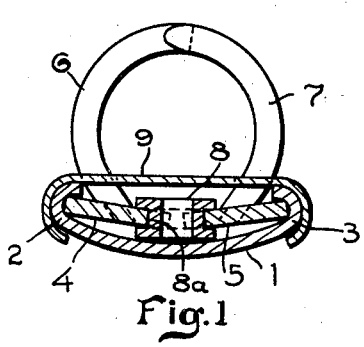
Figure 2:
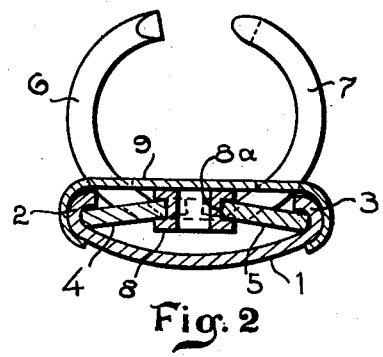
Figure 3:
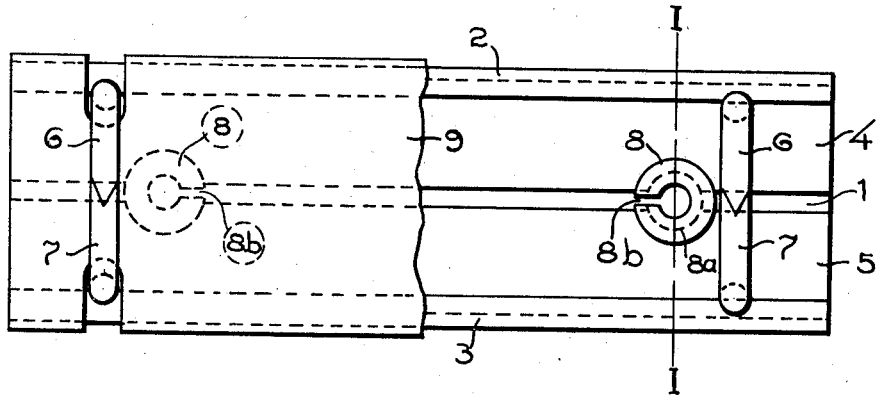
Figure 4:
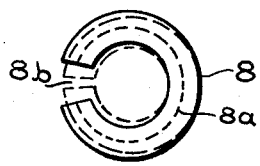

In the drawings:—Figure 1, is a cross section on line I—I of Fig. 3, showing the half-rings closed. Fig. 2, is a cross section on line I—I of Fig. 3 showing the half rings open. Fig. 3, is a top plan view, a portion of the cover being broken away. Fig. 4, is a detail of the spring action rivet.

I am aware that the spring action has been provided for the half ring carrying plates by means of connecting devices of stamped sheet metal. These, however, do not hold their resiliency as markedly and the spring thrust is not directly in the plane of the half-ring carrying plates as in the case with my structure. Having the spring thrust in the plane of the plates or substantially so, tends to thrust the opposite sides of the plates securely into the bearing channels and insures the half rings being held in open or closed position, whereas, with a stamped metal connecting device, the spring thrust upon the plates is angularly delivered against them.

1 is the base plate which is curved up at either side to form bearing channels 2 and 3. These bearing channels hold the half ring carrying plates 4 and 5, respectively, and these plates carry the half rings 6 and 7 that are adapted to hold the leaves of a book. The opposed edges of the half ring carrying plates are cut away for the reception of the spring action rivets 8. These rivets are bored out at the center as shown in Fig. 4. They are machined to provide the neck portion $8^a$ of the rivet and then cut away to leave the entrance $8^b$. This allows of the peripheral compression of the rivet which will then tend to resume its normal position affording a resilient action.

The cut away portions of the plates are arranged so that the edges bounding these portions will engage the neck of the rivet and will tend to compress it, thereby causing the rivet to spread laterally in the same way that a piston ring engages against the wall of a cylinder. This tends to bind the plates against their bearings so as to hold the half rings in the positions to which they may be opened or closed. The plates engaging the neck of the rivet between the two heads are held together in a toggle; the spring action residing entirely in the rivets.

The base plate may be of stiff material so as not to flex in nor flex out, and the cover plate 9 may be flat as no convexity is necessary to furnish the sheet metal to allow the cover plate to straighten out with the base plate during flexure. This allows more room between the tips of the half rings and the binder and hence gives more freedom to the leaves of the book. However, if desired, some of the spring action may be afforded from a spring metal base plate.

What I claim is:—

1. A loose-leaf binder, having a base plate provided with bearings, a pair of clasping units and a hollow split rivet for holding the clasping members together and furnishing the spring action to keep the clasping members in a given position of adjustment, substantially as described.

2. A loose-leaf binder, having in combination, a base plate provided with turned-in edges forming channel bearings, a pair of half-ring carrying plates, half-rings mounted on said half-ring carrying plates and a hollow split rivet for holding said half-rings and carrying plates together and for furnishing the spring action to keep the half-rings in any given position of adjustment, substantially as described.

3. A loose-leaf binder, having in combination, a base plate provided with bearings, clasping members journaled in said bearings, a spring action rivet comprising a hollow slitted member for holding the clasping members together and affording spring action to keep them in any given position of adjustment and a flat cover plate engaging over the base plate, substantially as described.

In testimony whereof, I sign this specification in the presence of two witnesses.

RICHARD M. WATSON.

Witnesses:
VIRGINIA C. SPRATT,
STUART C. BARNES.

Copies of this patent may be obtained for five cents each, by addressing the "Commissioner of Patents, Washington, D. C."